US009501296B2

(12) United States Patent
Saborowski et al.

(10) Patent No.: US 9,501,296 B2
(45) Date of Patent: Nov. 22, 2016

(54) HYPERVISOR AUTOMATION MANAGER FOR STARTING AN OPERATION SYSTEM WITH CUSTOMIZATION DATA FROM A DISK IMAGE

(75) Inventors: Ralf D. Saborowski, Leichlingen (DE); Ansgar Trimborn, Bonn (DE)

(73) Assignee: CA, Inc., New York, NY (US)

( * ) Notice: Subject to any disclaimer, the term of this patent is extended or adjusted under 35 U.S.C. 154(b) by 810 days.

(21) Appl. No.: 13/475,504

(22) Filed: May 18, 2012

(65) Prior Publication Data

US 2013/0311763 A1    Nov. 21, 2013

(51) Int. Cl.
*G06F 9/445* (2006.01)
*G06F 9/455* (2006.01)

(52) U.S. Cl.
CPC ........... *G06F 9/445* (2013.01); *G06F 9/45558* (2013.01); *G06F 2009/45575* (2013.01)

(58) Field of Classification Search
CPC ............... G06F 9/4406; G06F 9/45533; G06F 9/45537; G06F 9/45562; G06F 8/63; G06F 9/45558; G06F 2009/45562; G06F 9/445; G06F 9/45575
USPC .................................................. 713/2; 718/1
See application file for complete search history.

(56) References Cited

U.S. PATENT DOCUMENTS

| | | | |
|---|---|---|---|
| 8,745,585 B2* | 6/2014 | Watters et al. | 717/121 |
| 2004/0006688 A1* | 1/2004 | Pike et al. | G06F 8/61 713/1 |
| 2005/0027831 A1* | 2/2005 | Anderson et al. | 709/220 |
| 2007/0046791 A1* | 3/2007 | Wang et al. | 348/231.6 |
| 2007/0234334 A1* | 10/2007 | Araujo et al. | 717/168 |
| 2007/0300221 A1* | 12/2007 | Hartz et al. | 718/1 |
| 2008/0244577 A1* | 10/2008 | Le et al. | 718/1 |
| 2009/0077551 A1* | 3/2009 | Whiteley | 718/1 |
| 2009/0282404 A1* | 11/2009 | Khandekar et al. | 718/1 |
| 2010/0122248 A1* | 5/2010 | Robinson et al. | 718/1 |
| 2010/0250877 A1* | 9/2010 | Gaither | G06F 9/4856 711/162 |
| 2011/0107331 A1* | 5/2011 | Evans et al. | 718/1 |
| 2012/0144391 A1* | 6/2012 | Ueda | 718/1 |
| 2012/0246639 A1* | 9/2012 | Kashyap et al. | 718/1 |

(Continued)

*Primary Examiner* — Thomas Lee
*Assistant Examiner* — Danny Chan
(74) *Attorney, Agent, or Firm* — Baker Botts L.L.P.

(57) ABSTRACT

An automation manager configured to manage a plurality of sessions of operating systems implemented in a hypervisor. The automation manager includes a processor and a non-transitory computer-readable storage medium storing computer-readable instructions when executed by the processor cause the automation manager to perform: generating a compact disk image containing customization data; instructing the hypervisor to mount the compact disk image to an operating system created from an operating system template; and instructing the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed. Ejecting the compact disk image when the customization is complete.

17 Claims, 4 Drawing Sheets

(56) References Cited

U.S. PATENT DOCUMENTS

2013/0047154 A1* 2/2013 Mehta ................ G06F 9/45558
                                                          718/1
2013/0219388 A1* 8/2013 Moeller et al. .................. 718/1
2013/0297921 A1* 11/2013 Wright et al. .................... 713/2
2014/0040887 A1* 2/2014 Morariu et al. ................. 718/1

* cited by examiner

HYPERVISOR AUTOMATION MANAGER FOR STARTING AN OPERATION SYSTEM WITH CUSTOMIZATION DATA FROM A DISK IMAGE

BACKGROUND

The present disclosure relates generally to methods and systems for customizing operating systems, and more specifically, to methods and systems for customizing operating systems installed on virtual machines.

Many computers now may have multiple cores in their computer processing units ("CPU"). Thus, each computer may have processing capability for concurrently executing more than one operating systems. For example, a hypervisor is a computer that concurrently executes multiple sessions of operating systems, such that a plurality of users may log into the computer simultaneously to use respective sessions of operating systems executed on the computer. Each of the operating system sessions is executed independently without interfering with another. For example, a hypervisor may execute different versions of WINDOWS® operating systems at the same time for different users. Each of these sessions of operating systems may be referred to as a virtual machine. Thus, one hardware computer may function as a plurality of virtual machines when the hardware computer executes a plurality of sessions of operations systems.

A virtualization process may be a process of implementing a plurality of virtual machines in one hardware computer. A computer server with sufficient processing and memory capacities may implement hundreds or even thousands of virtual machines. A plurality of users may execute their respective virtual machines on the computer server by accessing the computer server remotely or locally. Thus, virtualization allows one hardware computer to implement a plurality of virtual machines that are utilized by a plurality of users. Each of the plurality of virtual machines runs independently without interfering with another.

Virtualization management tools are provided to implement rapid creation of additional virtual machines. The virtualization management tools may use operating system templates for rapid provisioning of additional virtual machines. An operating system template is a frozen image of a previously configured virtual machine containing a ready-to-boot operating system. The operating system template may be duplicated repeatedly to create a plurality of additional virtual machines, e.g., a plurality of sessions of operating systems. Because each of the additional virtual machines is duplicated from the same operating system template, these additional virtual machines are substantially identical to each other. For example, these duplicated virtual machines have identical names or addresses. Thus, these duplicated virtual machines must be customized before they are used on a network. Consequently, these additional virtual machines are customized to have unique ID, user login, password, or the like, before they are connected to a network of computing devices.

BRIEF SUMMARY

According to an embodiment of the disclosure, an automation manager configured to manage a plurality of sessions of operating systems implemented in a hypervisor, the automation manager comprising: a processor; and a computer-readable storage medium storing computer-readable instructions, which when executed by the processor, cause the automation manager to perform: generating a compact disk image containing customization data; instructing the hypervisor to mount the compact disk image to an operating system created from an operating system template; and instructing the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed.

According to another embodiment of the disclosure, a method for customizing an operating system comprising: generating a compact disk image containing customization data; instructing a hypervisor to mount the compact disk image to an operating system created from an operating system template; and instructing the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed.

According to still another embodiment of the disclosure, a method for generating an operating system template comprising: preparing a source operating system; incorporating compact disk image reading instructions into a native boot time application of the source operating system; sealing the source operating system; converting the sealed source operating system into an operating system template; and storing the operating system template in a template library.

According to a further embodiment of the disclosure, a computer program product comprising: a computer readable storage medium having computer readable program code embodied therewith, the computer readable program code comprising: computer readable program code configured to generate a compact disk image containing customization data; computer readable program code configured to instruct a hypervisor to mount the compact disk image to an operating system created from an operating system template; and computer readable program code configured to instruct the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed.

According to a still further embodiment of the disclosure, a computer program product comprising: a computer readable storage medium having computer readable program code embodied therewith, the computer readable program code comprising: computer readable program code configured to prepare a source operating system; computer readable program code configured to incorporate compact disk image reading instructions into a native boot time application of the source operating system; computer readable program code configured to seal the source operating system; computer readable program code configured to convert the sealed source operating system into an operating system template; and computer readable program code configured to store the operating system template in a template library.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
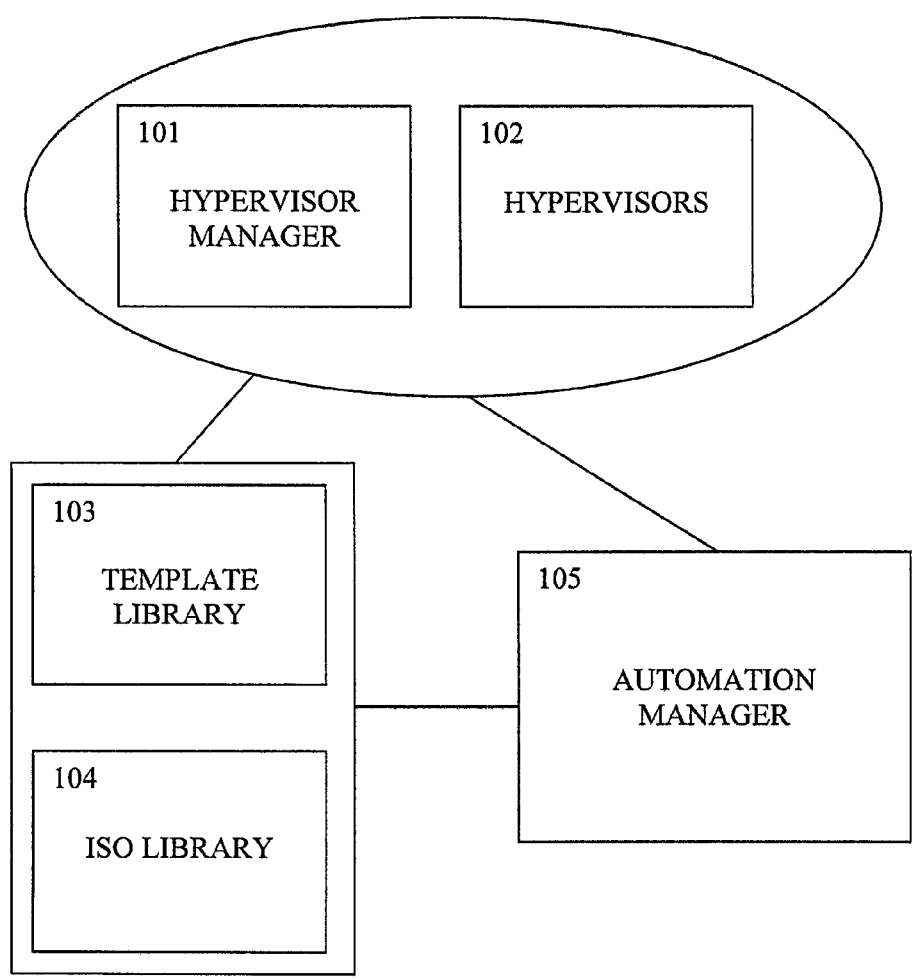
FIG. 1 is a diagram depicting an operating system customization system according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

WINDOWS® operating system provides a system preparation application called "SYSPREP" that seals, e.g., freeze, a running copy of an operating system to create a generalized operating system image. Further, SYSPREP customizes and sets up duplicated WINDOWS® operating systems. In particular, SYSPREP may store customization settings in an answer file which is activated during a next boot of an operating system. By storing the customization settings in the answer file, the boot process immediately following the seal process is automated, such that manual user input is no longer required to customize the operating system. Further, the operating system configuration performed by a mini setup portion of SYSPREP may be prevented from waiting indefinitely for a user input. Thus, SYSPREP may be used to implement mass deployment of the WINDOWS® operating system in a plurality of computers. Nevertheless, SYSPREP uses a hard coded location, i.e., a fixed location, in the operating system boot partition for this answer file. Further, SYSPREP is integrated with the WINDOWS boot process, such that SYSPREP starts up very early in the Windows boot process. Thus, regular user level autorun mechanisms attempting to overwrite or insert external customization settings to the answer file do not work. Thus, the content of SYSPREP's answer file can not be changed externally to create customized virtual machines from the same operating system template.

An approach for changing the customization settings in SYSPREP's answer file is to mount a virtual disk image containing the operating system boot partition on a hypervisor to modify or overwrite the content. Nevertheless, this approach has the following problems and limitations. The hypervisor or the operating system in which the hypervisor is running must support mounting of virtual disk images. Many hypervisors do not support virtual disk image mounting or support limited subset of image formats. Further, even if a virtual disk image is mounted through the hypervisor, the virtualization management software must support the file system inside the virtual machine. For example, in a LINUX® system, if a virtual disk has been formatted by a WINDOWS® new technology file system ("NTFS"), the content of the virtual disk becomes non-usable by the LINUX® system, unless NTFS support is installed in the LINUX® system.

Referring to FIG. 1, an operating system customization system 100 may include a hypervisor manager 101 and hypervisors 102. Hypervisors 102 may include a plurality of computers or servers that have processing and memory capacities for implementing a plurality of sessions of operating systems, e.g., for creating a plurality of virtual machines. For example, hypervisors 102 may concurrently run a plurality of operating systems, such that each of the operating systems may run independently without interfering with another. Each of the operating systems may be referred to as a virtual machine. Each virtual machine executed by hypervisors 102 may be accessed locally or remotely via a network.

Hypervisor manager 101 may be an application, e.g., CITRIX® XenServer, REDHAT® ENTERPRISE VIRTUALIZATION/KVM or the like, that may manage hypervisors 102. For example, hypervisor manager 102 may manage the simultaneous executions of the plurality of operating systems, e.g., of the plurality of virtual machines, in hypervisors 102. Hypervisor manager 101 also may manage storage and access of the plurality of sessions of operating systems in hypervisors 102. Hypervisor manager 101 may be implemented on a separate computer or server connected to hypervisors 102 directly or via a network. In another aspect, hypervisor manager 101 may be implemented on the same computer or server as hypervisors 102. In still another aspect, one of hypervisors 102 may be designated as hypervisor manager 101 that may manage the other hypervisors 102. In yet another aspect, hypervisors 102 may function without hypervisor manager 101 and may be managed by an external automation manager.

Operating system customization system 100 further may include a template library 103 and an ISO library 104. Template library 103 may comprise a storage device configured to store operating system templates. Template library 103 may be included in a computer or server separate from hypervisors 102. In another embodiment, template library 103 may be included in hypervisors 102. Further, ISO library 104 may comprise a storage device configured to store CD image files. ISO library 104 may be included in a separate computer or server from hypervisors 102. In another embodiment, ISO library 104 may be included in hypervisors 102. Template library 103 and ISO library 104 may be managed by hypervisor manager 101 or each of hypervisors 102. In another aspect, template library 103 and ISO library 104 may be managed by one of hypervisors 102 that functions as a hypervisor manager.

Virtual machine customization system 100 also may include an automation manager 105. Automation manager 105 may support hypervisor manager 101 to automate and manage processes in hypervisors 102. Further, automation manager 105 may manage the plurality of virtual machines or virtual systems in hypervisors 102. For example, automation manger 104 may determine the processing and memory capacities of hypervisors 102 to host virtual machines or systems. Automation manager 105 may provide an interface allowing input for creation and customization of new virtual machines or systems in hypervisors 102. Automation manager 105 may be implemented in a separate computer or server from hypervisors 102. In another embodiment, automation manager 105 may be implemented in hypervisor 102. When a hypervisor manager 101 is provided, automation manager 105 may support hypervisor manager 101 to implement management of virtual machines or systems. When one of the hypervisors 102 functions as a hypervisor manager 101, automation manger 105 may support the one of the hypervisors 102 to implement management of virtual machines or systems. When no hypervisor manager 101 is provided, automation manager 105 may function to execute management of virtual machines or systems in hypervisors 102.

Figure 2:
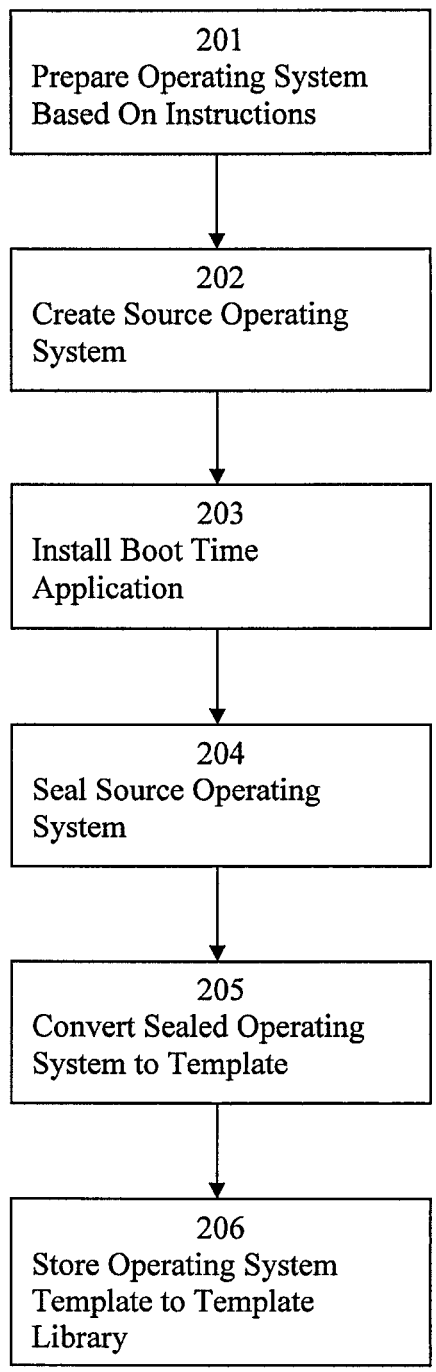
FIG. 2 is a flowchart depicting an operating system template preparation process according to an embodiment of the disclosure.

Referring to FIG. 2, an operating system template preparation process 200 may be executed to create an operating system template. Operating system template preparation process 200 may be executed in the computer or server that implements automation manager 105. In another embodiment, operating system template preparation process 200 may be executed in a different computer or server that executes automation manager 105.

At step 201, instructions for preparing an operating system template may be received. These instructions may include information relating to types of operating system and customized settings. For example, a company or organization may create an operating system template including customized settings for the specific requirements of the company or organization. Thus, the created operating system template may be used as a master copy to implement mass deployment of operating systems in a plurality of machines in the company or organization.

At step 202, a Source operating system may be created based on the instructions received in step 201. At step 203, a setup provisioning helper may incorporate a native boot time application to the source operating system. The native boot time application may begin to run early in a boot up process of an operating system. Specifically, the native boot time application may contain instructions to read data from a CD mounted on a CD ROM of the virtual machine, e.g., operating system, before the system preparation application is executed. In particular, the native boot time application may include instructions to check whether a CD, e.g., an ISO 9660 CD ROM image file, is loaded in the CD tray of the virtual machine; determine whether a file having a specific file structure, e.g., an answer file for the preparing application, with specific file name is stored in the loaded CD; and, when the file having the specific file structure with specific file name is stored in the loaded CD, read data from the file stored in the loaded CD and store the read data in a specific location for the system preparation application to execute.

At step 204, the system preparation application may seal or freeze the source operating system and may convert the source operating system into a operating system template at step 205. The system preparation application may be compatible to work in a hardware computer running operating system or in a plurality of virtual machines running operation systems in a hardware computer. At step 206, the operating system template may be stored in template library 103.

Figure 3:
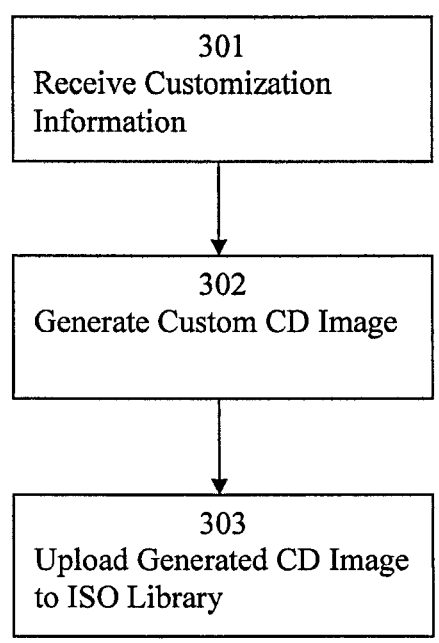
FIG. 3 is a flowchart depicting a compact disk image generation process according to an embodiment of the disclosure.

Referring to FIG. 3, a CD image generation process 300 may be implemented by automation manager 105. At step 301, automation manager 105 may receive customization information. For example, automation manager 105 may provide an interface through which a user may input instructions for customizing a virtual machine. Customization information may include computer name, user name, password, network ID or the like, for customizing a virtual machine, e.g., an operating system. At step 302, automation manager 105 may generate a CD image containing the customization information received in step 301. Further, the CD image may contain instructions to eject a CD when the system preparation application is determined to be terminated. Further, the CD image may include instructions for checking whether a system preparation application has terminated. At step 303, automation manager 105 may upload the created CD image to ISO library 104. Specifically, automation manager 105 may load the CD image to ISO library 104 via one of a secure shell ("SSH"), a secure file transfer protocol ("SFTP"), a network file system ("NFS"), an internet small computer system interface ("iSCSI"), and a fiber channel ("FC") connection between automation manager 105 and ISO library 104.

Figure 4:
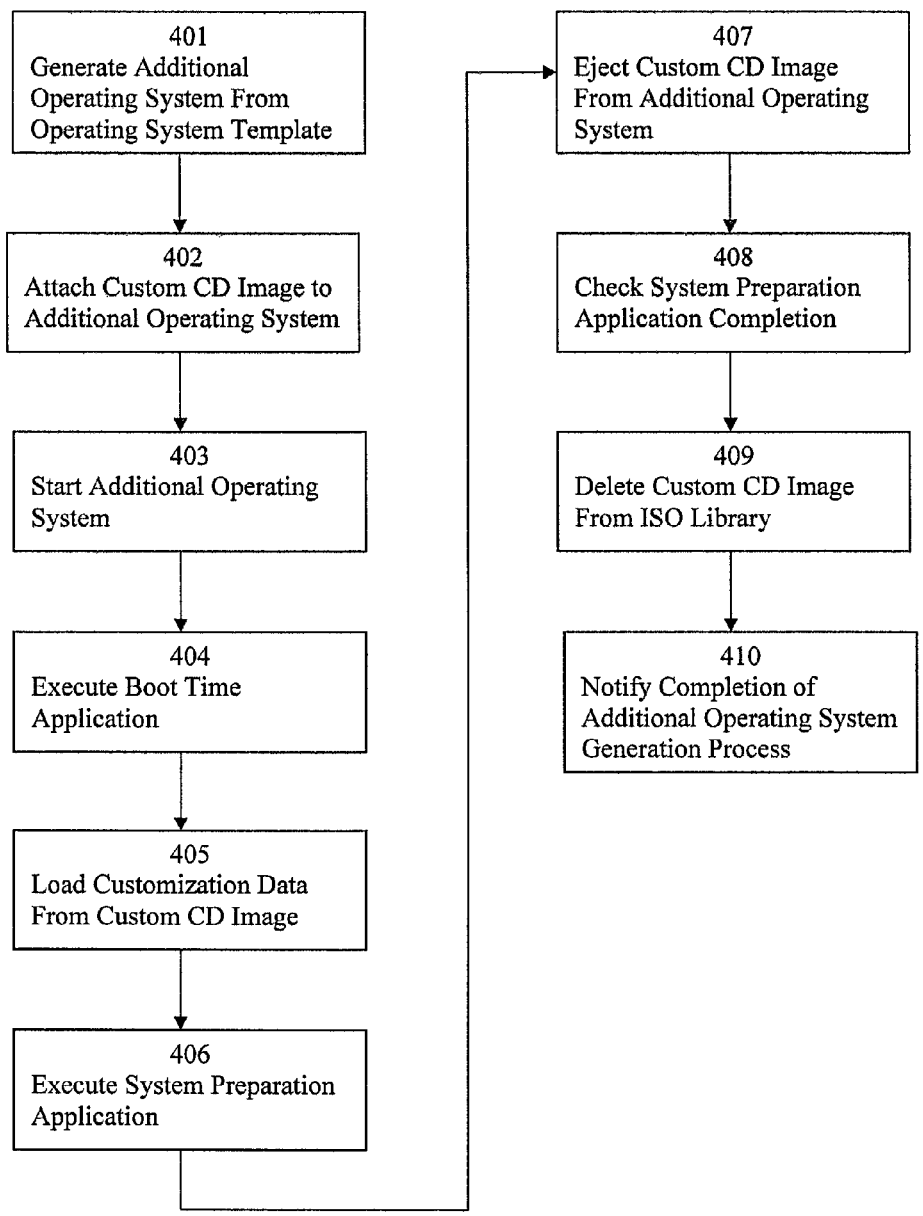
FIG. 4 is a flowchart depicting an operating system customization process according to an embodiment of the disclosure.

Referring to FIG. 4, an operating system customization process 400 may be implemented to generate a customized operating system, e.g., virtual machine. At step 401, an additional operating system may be generated from the operating system template stored in template library 103. Specifically, a request to create an additional virtual machine may be received by automation manager 105. In response to the request, a copy of the operating system template may be retrieved from template library 105. An additional session of operating system, e.g., an additional virtual machine, may be created in hypervisors 102 from the copy of the operating system template. At this time, the additional operating system may be identical to the one represented by the operating system template. Automation manager 105 then may execute CD image generation process 300 to generate the CD image containing the customization data and upload the CD image to ISO library 104. At step 402, automation manager 104 may send instructions to hypervisor manager 101 to attach the CD image to the additional operating system. Specifically, with respect to the operating system, the attachment of the CD image to the virtual machine may be a virtual equivalent to physically mounting a CD on a CD tray of a hardware computer or server.

At step 403, automation manager may send instructions to hypervisor manager 101 to start, e.g., boot up, the additional operating system. At step 404, the native boot time application of the additional operating system may be executed during the start up process. The native boot time application may begin to run relatively early in the start up process before a mini setup logic of the system preparation application is activated. Specifically, the native boot time application may contain instructions for checking and reading data from the CD ROM of the additional virtual machine, as described in step 203. Thus, the additional operating system may determine whether a CD image is mounted to the additional operating system, e.g., whether a CD is loaded on the CD tray of the additional virtual machine. If a CD image is mounted to the additional operating system, the additional operating system may determine whether an answer file for the system preparation application is stored in a specific directly in the CD image. If so, the additional operating system may read the answer file containing the customization data from the CD image. At step 405, the additional operating system may store the answer file containing the customization data in the specific location accessible by system preparation application, before the system preparation application is executed. Specifically, the original answer file for the system preparation application stored in the specific location of the boot partition may be replaced by the answer file containing the customization data from the CD image.

At step 406, the system preparation application may be executed. Specifically, the system preparation application may read the answer file stored in the specific location of the boot partition. Because the original answer file has been replaced by the answer file containing customization data from the CD image, the system preparation application may read the customization data and may customize the additional virtual machine based on the customization data from the CD image. Thus, the additional virtual machine, e.g., additional operating system, may be customized to have custom settings, such as customized user name, login ID, password, network configuration, time zone, workgroup, domain, and the like. At step 407, the additional virtual machine may eject the CD image from the additional virtual machine after the system preparation application completes customization of the additional virtual machine, based on the instructions contained in the answer file of the CD image, as described in step 302.

At step 408, automation manager 105 may determine whether the execution of the system preparation application is complete by checking whether the additional virtual machine has ejected the CD image. Thus, automation manager 105 may confirm whether the system preparation application has finished customizing the additional virtual machine by checking the ejection of CD image from the additional virtual machine. At step 409, after automation manager 105 confirms that the additional virtual machine has been customized, automation manager 105 may delete the custom CD image from ISO library 104. At step 410, automation manager 105 may generate a notification indicating that the additional virtual machine has been customized and ready for use.

Accordingly, during the initial start-up process of an additional virtual machine, the original system preparation answer file of the additional virtual machine may be replaced with another system preparation answer containing customization data before the system preparing application is executed. Thus, customization data may be provided externally to the system preparation answer file of the additional virtual machine, even if the additional virtual machine is duplicated from an operating system template. Further, because the CD image format may be supported across hypervisors of different platforms, the CD image may allow consistent insertions of customization data into additional virtual machines.

The above systems and methods may be implemented on WINDOWS® operating systems. The following descriptions are provided for an embodiment of the disclosure in which the systems and methods are implemented on WINDOWS® operating systems. Referring to FIG. 1, operating system customization system 100 may include hypervisor manager 101 and hypervisors 102. Hypervisors 102 may include a plurality of computers or servers that have processing and memory capacities for implementing a plurality of sessions of WINDOWS® operating systems, e.g., WINDOWS® virtual machines. For example, hypervisors 102 may concurrently run a plurality of WINDOWS® operating systems, such that each of the WINDOWS® operating systems may run independently without interfering with each other. Each of the WINDOWS® operating systems may be referred to as a WINDOWS® virtual machine. Each WINDOWS® virtual machine executed by hypervisors 102 may be accessed locally or remotely via a network.

Hypervisor manager 101 may be an application, e.g., CITRIX® XenServer, REDHAT® ENTERPRISE VIRTUALIZATION/KVM or the like, that may manage hypervisors 102. For example, hypervisor manager 102 may manage the simultaneous executions of the plurality of WINDOWS® operating systems, e.g., WINDOWS® virtual machines, in hypervisors 102. Hypervisor manager 102 also may manage storage and access of the plurality of sessions of WINDOWS® operating systems in hypervisors 102. Hypervisor manager 101 may be implemented on a separate computer or server connected to hypervisors 102. In another embodiment, hypervisor manager 101 may be implemented on the same computer or server as hypervisors 102.

Operating system customization system 100 further may include template library 103 and an ISO library 104. Template library 103 may comprise a storage device configured to store WINDOWS® operating system templates. Template library 103 may be included in a computer or server separate from hypervisors 102. In another embodiment, template library 103 may be included in hypervisors 102. Further, ISO library 104 may comprise a storage device configured to store compact disk ("CD") image files. ISO library 104 may be included in a separate computer or server from hypervisors 102. In another embodiment, ISO library 104 may be included in hypervisors 102.

Operating system customization system 100 also may include automation manager 105. Automation manager 105 may support hypervisor manager 101 to automate and manage processes in hypervisors 102. Further, automation manager 105 may manage the plurality of WINDOWS® virtual machines or virtual systems in hypervisors 102. For example, automation manger 104 may determine the processing and memory capacities of hypervisors 102 to host WINDOWS® virtual machines or systems. Automation manager 105 may provide an interface allowing input for creation and customization of new WINDOWS® virtual machines or systems in hypervisors 102. Automation manager 105 may be implemented in a separate computer or server from hypervisors 102. In another aspect, hypervisor manager 101 may be implemented on the same computer or server as hypervisors 102. In still another aspect, one of hypervisors 102 may be designated as hypervisor manager 101 that may manage the other hypervisors 102. In yet another aspect, hypervisors 102 may function without hypervisor manager 101 and may be managed by an external automation manager.

Referring to FIG. 2, operating template preparation process 200 may be executed to create a WINDOWS® operating system template. Operating system template preparation process 200 may be executed in the computer or server that implements automation manager 105. In another embodiment, windows template preparation process 200 may be executed in a different computer or server from automation manager 105.

At step 201, instructions for preparing a WINDOWS® operating system template may be received. These instructions may include information relating to types of WINDOWS® operating system and customized settings. For example, a company or organization may create a WINDOWS® operating system template including customized settings for the specific requirements of the company or organization. Thus, the created WINDOWS® operating system template may be used as a master copy to implement mass deployment of WINDOWS® operating systems in a plurality of computers or servers in the company or organization.

At step 202, a source WINDOWS® operating system may be created based on the instructions received in step 201. At step 203, a setup provisioning helper may incorporate a native boot time application to the source WINDOWS® operating system. The native boot time application may be WINDOWS® application using "native" NT API, which is different from WIN32 API used by regular applications. Thus, the native boot time application may begin to run relatively early in the boot process of a WINDOWS® operating system before a WIN32 subsystem is started and available. Specifically, the native boot time application may contain instructions to read data from a CD mounted on a CD ROM of the WINDOWS® virtual machine, e.g., WINDOWS® operating system, before the WINDOWS® SYSPREP application is executed. In particular, the native boot time application may include instructions to check whether a CD, e.g., an ISO 9660 CD ROM image file, is loaded in the CD tray of the WINDOWS® virtual machine; determine whether a file having a WINDOWS® SYSPREP answer file structure and file name is stored in the loaded CD; and, when the file having WINDOWS® SYSPREP answer file structure and file name is stored in the loaded CD, read data from the file stored in the loaded CD and store the read data in a specific location for the WINDOWS® SYSPREP application to execute.

At step 204, the WINDOWS® SYSPREP application may seal or freeze the source WINDOWS® operating system and may convert the source WINDOWS® operating system into a WINDOWS® operating system template. The WINDOWS® SYSPREP application may be compatible to work in a hardware computer running WINDOWS® operating system or in a plurality of virtual machines running WINDOWS® operation systems in a hardware computer. At step 206, the WINDOWS® operating system template may be stored in template library 103.

Referring to FIG. 3, a CD image generation process 300 may be implemented by automation manager 105. At step 301, automation manager 105 may receive customization information. For example, automation manager 105 may provide an interface through which a user may input instructions for customizing a virtual machine. Customization information may include computer name, user name, password, network ID or the like, for customizing a WINDOWS® virtual machine, e.g., WINDOWS® operating system. At step 302, automation manager 105 may generate an ISO 9660 CD image containing the customization information received in step 301. Further, the ISO 9660 CD image may include instructions for checking whether a WINDOWS® SYSPREP application has terminated. Specifically, the ISO 9660 CD image may contain instructions to eject a CD when a WINDOWS® SYSPREP application is determined to be terminated. At step 303, automation manager 105 may upload the created ISO 9660 CD image to ISO library 104. Specifically, automation manager 105 may load the ISO 9660 CD image to ISO library 104 via one of a secure shell ("SSH"), a secure file transfer protocol ("SFTP"), a network file system ("NFS"), an internet small computer system interface ("iSCSI"), and a fiber channel ("FC") connection between automation manager 105 and ISO library 104.

Referring to FIG. 4, an operating system customization process 400 may be implemented to generate a customized WINDOWS® operating system, e.g., WINDOWS® virtual machine. At step 401, a new WINDOWS® operating system may be generated from the WINDOWS® operating system template stored in template library 103. Specifically, a request to create a new WINDOWS® virtual machine may be received by automation manager 105. In response to the request, a copy of the WINDOWS® operating system template may be retrieved from template library 105. A new session of WINDOWS® operating system, e.g., new WINDOWS® virtual machine, may be created in hypervisors 102 from the copy of the WINDOWS® operating system template. At this time, the new WINDOWS® operating system may be identical to the one represented by the WINDOWS® operating system template. Automation manager 105 then may execute CD image generation process 300 to generate the ISO 9660 CD image containing the customization data and upload the ISO 9660 CD image to ISO library 104. At step 402, automation manager 104 may send instructions to hypervisor manager 101 to attach the ISO 9660 CD image to the new WINDOWS® operating system. Specifically, with respect to the WINDOWS® operating system, the attachment of the ISO 9660 CD image to the WINDOWS® virtual machine may be a virtual equivalent to physically mounting a CD on a CD tray of a hardware computer running WINDOWS® operating system.

At step 403, automation manager may send instructions to hypervisor manager 101 to start, e.g., boot up, the new WINDOWS® operating system. At step 404, the native boot time application of the new WINDOWS® operating system may be executed during the start up process. The native boot time application may run relatively early in the boot process before mini setup logic of SYSPREP is activated. Specifically, the native boot time application may contain instructions for checking and reading data from the CD ROM of the new WINDOWS® virtual machine, as described in step 203. Thus, whether a CD image is mounted to the new WINDOWS® operating system, e.g., whether a CD is loaded on the CD tray of the new WINDOWS® virtual machine, may be determined. If a CD image is mounted to the new WINDOWS® operating system, the new WINDOWS® operating system may determine whether a SYSPREP answer file is stored in a specific directly in the CD image. If so, the new WINDOWS® operating system may read the SYSPREP answer file containing the customization data from the ISO 9660 CD image. At step 405, the new WINDOWS® operating system may store the SYSPREP answer file containing the customization data in the specific location accessible by SYSPREP application, before the SYSPREP application is executed. Specifically, the original answer file for the SYSPREP application stored in the specific location of the boot partition may be replaced by the answer file containing the customization data from the ISO 9660 CD image.

At step 406, the SYSPREP application may be executed. Specifically, the SYSPREP application may read the answer file stored in the specific location of the boot partition. Because the original answer file has been replaced by the answer file containing customization data from the ISO 9660 CD image, the SYSPREP application may read the customization data and may customize the new WINDOWS® virtual machine based on the customization data from the ISO 9660 CD image. Thus, the new WINDOWS® virtual machine, e.g., new WINDOWS® operating system, may be customized to have custom settings, such as customized user name, login ID, password, network configuration, time zone, workgroup, domain, and the like. At step 407, the new WINDOWS® virtual machine may eject the ISO 9660 CD image from the new WINDOWS® virtual machine after the SYSPREP application completes customization of the new WINDOWS® virtual machine, based on the instructions contained in the ISO 9660 CD image, as described in step 302.

At step 408, automation manager 105 may determine whether the execution of the SYSPREP application is complete by checking whether the new WINDOWS® virtual machine has ejected the ISO 9660 CD image. Thus, automation manager 105 may confirm whether the SYSPREP application has finished customizing the new WINDOWS® virtual machine by checking the ejection of ISO 9660 CD image from the new WINDOWS® virtual machine. At step 409, after automation manager 105 confirms that the new WINDOWS® virtual machine has been customized, automation manager 105 may delete the custom CD image from ISO library 104. At step 410, automation manager 105 may generate a notification indicating that the new WINDOWS® virtual machine has been customized and ready for use.

Accordingly, during the initial start-up process of a new WINDOWS® virtual machine, the original SYSPREP answer file of the new WINDOWS® virtual machine may be replaced with another SYSPREP answer containing customization data before the SYSPREP application is executed. Thus, customization data may be provided externally to the SYSPREP answer file of the new WINDOWS® virtual machine, even if the new WINDOWS® virtual machine is duplicated from a WINDOWS® operating system template. Further, because the ISO 9660 CD image format is supported across hypervisors of different platforms, the ISO 9660 CD image may allow consistent insertions of customization data into new WINDOWS® virtual machines.

Accordingly, the present disclosure may provide methods and systems that allow external provision of updated customization answer files and other types of command scripts to a sealed WINDOWS® SYSPREP template. The method and system may be implemented universally across hypervisor platforms and virtual disk image formats. Specifically, the present disclosure may provide methods and systems that externally provide a customized SYSPREP answer file and replaces the original SYSPREP answer file with the customized SYSPREP answer file in the hard coded location during an initial boot process even after the WINDOWS® operating template has been sealed by SYSPREP.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An automation manager configured to manage a plurality of sessions of operating systems implemented in a hypervisor, the automation manager comprising:
   a processor; and
   a non-transitory computer-readable storage medium storing computer-readable instructions, which when executed by the processor, cause the automation manager to perform:
      generating a compact disk image containing customization data;
      instructing the hypervisor to mount the compact disk image to an operating system created from an operating system template;
      instructing the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed;
      determining whether the compact disk image is ejected from the operating system; and
      when the compact disk image is ejected from the operating system, generating a notification indicating that the operating system has been customized based on the customization data.

2. The automation manger of claim 1, wherein generating a compact disk image comprises:
   receiving the customization data via a user interface of the automation manager;
   incorporating the customization data into the compact disk image;
   incorporating into the compact disk image instructions for ejecting the compact disk image from the operating system when the system preparation process completes customization of the operating system;
   transmitting the compact disk image to an ISO library; and
   storing the compact disk image in the ISO library.

3. The automation manager of claim 2, wherein the computer-readable instructions when executed by the processor cause the automation manager to further perform:
   deleting the compact disk image from the ISO library, when the compact disk image is ejected from the operating system.

4. The automation manger of claim 2, wherein the compact disk image is transmitted to the ISO library via at least one of a secure shell, a secure file transfer protocol, a network file system, an internet small computer system interface, and a fiber channel communication protocol.

5. The automation manager of claim 1, wherein the compact disk image is an ISO 9660 compact disk image file.

6. The automation manager of claim 1, wherein the operating system is a WINDOWS® operating system and the system preparation process is a WINDOWS® SYSPREP application.

7. The automation manager of claim 1, wherein the computer-readable instructions when executed by the processor cause the automation manager to further perform an operating system template generation process comprising:
   preparing a source operating system;
   incorporating compact disk image reading instructions into a native boot time application of the source operating system;
   sealing the source operating system;
   converting the sealed source operating system into the operating system template; and
   storing the operating system template in a template library.

8. The automation manager of claim 7, wherein the compact disk image reading instructions comprise instructions for:
   detecting whether the compact disk image is mounted to the operating system;
   when the compact disk image is mounted to the operating system, determining whether a specific file having specific format is stored in a specific location of the compact disk image;
   when the specific file is stored in the compact disk image, read the customization data stored in the compact disk image and store the customization data in the predetermined location of the operating system designated for the system preparation process; and
   after the customization data is stored in the predetermined location, executing the system preparation process to customize the operating system based on the customization data.

9. A method for customizing an operating system comprising:
   generating a compact disk image containing customization data;
   instructing a hypervisor to mount the compact disk image to an operating system created from an operating system template;
   instructing the hypervisor to start the operating system to which the compact disk image is mounted and execute a native boot time application to read the customization data from the compact disk image and store the customization data in a predetermined location of the operating system designated for a system preparation process, which customizes the operating system based on the customization data, before the system preparation process is executed;
   determining whether the compact disk image is ejected from the operating system; and
   when the compact disk image is ejected from the operating system, generating a notification indicating that the operating system has been customized based on the customization data.

10. The method of claim 9, wherein generating a compact disk image comprises:
   receiving the customization data via a user interface;
   incorporating the customization data into the compact disk image;
   incorporating into the compact disk image instructions for ejecting the compact disk image from the operating system when the system preparation process completes customization of the operating system;
   transmitting the compact disk image to an ISO library;
   storing the compact disk image in the ISO library.

11. The method of claim 10 further comprising:
   deleting the compact disk image from the ISO library, when the compact disk image is ejected from the operating system.

12. The method of claim 10, wherein the compact disk image is transmitted to the ISO library via at least one of a secure shell, a secure file transfer protocol, a network file system, an internet small computer system interface, and a fiber channel communication protocol.

13. The method of claim 9, wherein the compact disk image is an ISO 9660 CD image file.

14. The method of claim 9, wherein the operating system is a WINDOWS® operating system and the system preparation process is a WINDOWS® SYSPREP application.

15. A method for generating an operating system template comprising:
   incorporating compact disk image reading instructions into a native boot time application of a source operating system;
   sealing the source operating system;
   converting the sealed source operating system into an operating system template; and
   storing the operating system template in a template library,
   wherein the compact disk image reading instructions comprise instructions for:
   detecting whether a compact disk image is mounted to an operating system;
   when the compact disk image is mounted to the operating system, determining whether a specific file containing customization data and having specific format is stored in a specific location of the compact disk image;
   when the specific file is stored in the compact disk image, read the customization data stored in the compact disk image and store the customization data in a predetermined location of the operating system designated for a system preparation process;
   determining whether the compact disk image is ejected from the operating system;
   when the compact disk image is ejected from the operating system, generating a notification indicating that the operating system has been customized based on the customization data; and
   after the customization data is stored in the predetermined location, executing the system preparation process to customize the operating system based on the customization data.

16. The method of claim 15, wherein the compact disk image is an ISO 9660 CD image file.

17. The method of claim 15, wherein the operating system is a WINDOWS® operating system and the system preparation process is a WINDOWS® SYSPREP application.

* * * * *